United States Patent [19]
Astle

[11] 3,713,985
[45] Jan. 30, 1973

[54] DEVICE AND METHOD FOR TESTING POTENCY OF BIOLOGICAL CONTROL REAGENTS

[75] Inventor: Thomas W. Astle, Orange, Conn.
[73] Assignee: Fred S. Kantor, Orange, Conn.
[22] Filed: Oct. 19, 1970
[21] Appl. No.: 81,781

[52] U.S. Cl............195/103.5 R, 195/100, 195/127, 23/253 R
[51] Int. Cl. ..............................................C12k 1/04
[58] Field of Search .........195/103.5 R, 139 LE, 127; 23/253 R; 220/23.4 R

[56] References Cited

UNITED STATES PATENTS

| 3,272,719 | 9/1966 | Avakian......................195/103.5 R |
| 3,107,204 | 10/1963 | Brown et al...................195/103.5 R |
| 2,871,168 | 1/1959 | Salisbury......................195/139 LE |

OTHER PUBLICATIONS

Koch et al., "Nature", 208: 50–51.
Beargie et al., "Appl. Microbiol", 13(2):279–280, (1965).
Florey et al., Antibiotics Vol. II, p. 793–794, (1949).

Primary Examiner—Alvin E. Tanenholtz
Assistant Examiner—Max D. Hensley
Attorney—Delio and Montgomery

[57] ABSTRACT

Device for testing the potency of a biological control reagent, as in antibiotic susceptibility testing, especially the determination of minimum inhibitory concentration, comprising a strip of a plurality of interconnected plastic cups having a capacity of about 0.3 ml. each. All but two of the cups contain a range of amounts of the control reagent in an essentially dry state which will provide a predetermined range of concentrations when the reagent is redispersed. Contamination of the dry reagent in the cups is prevented by an adherent plastic film or aluminum foil across the openings of the cups. In use, the adherent film or foil is removed, the dry reagent is redispersed to form the required range of concentrations, and all of the cups except one are inoculated with the biological material against which the potency of the control reagent is to be tested. The last cup contains the dispersion medium but not the control reagent nor inoculum, and provides a sterility control. The second last cup contains the dispersion medium and the inoculum, and serves as a growth control. The strip of cups is then resealed, incubated, and the test results are read.

20 Claims, 4 Drawing Figures

PATENTED JAN 30 1973 3,713,985
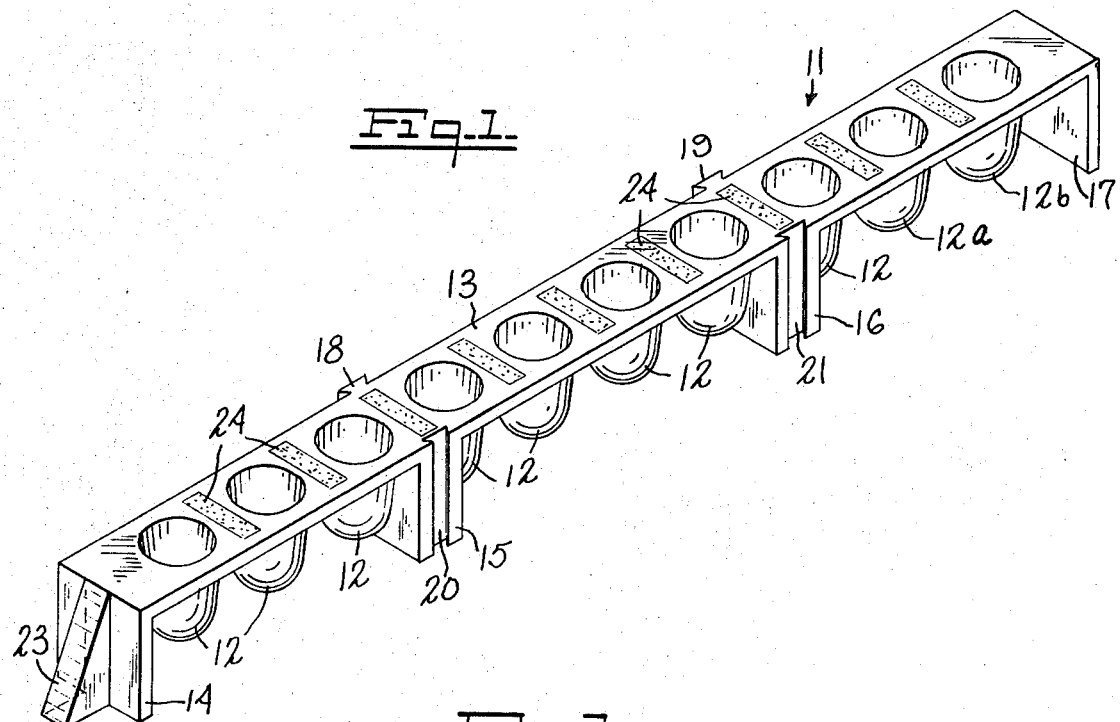
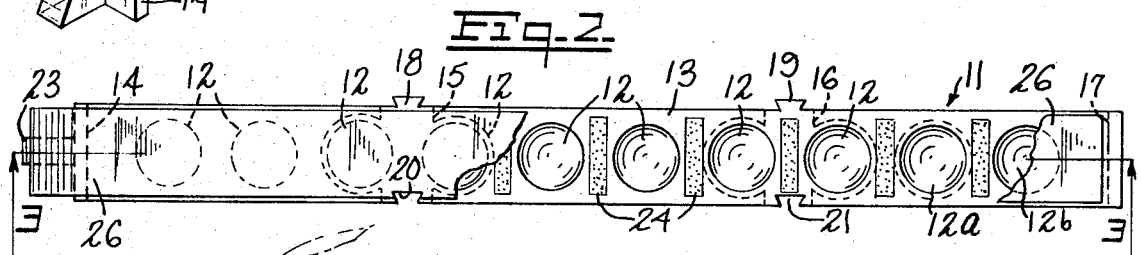
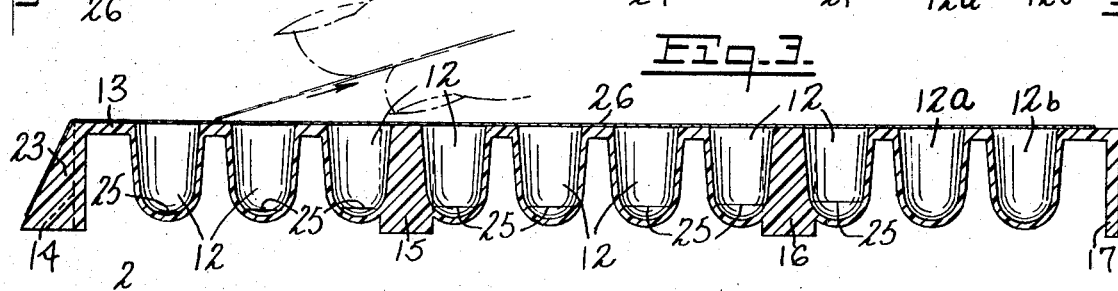
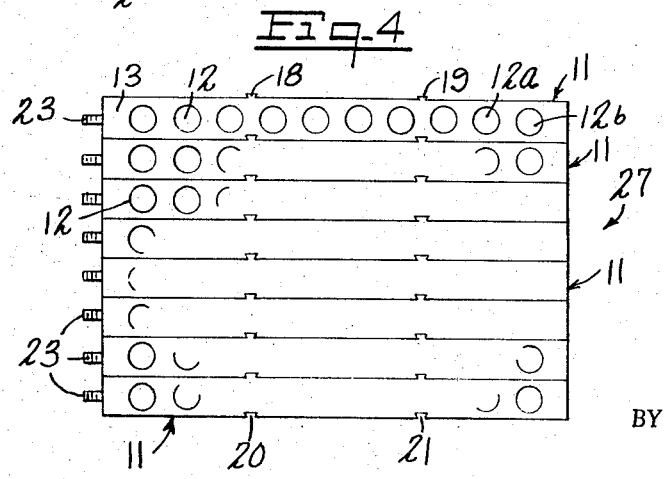
INVENTOR
Thomas W. Astle
BY De Lio and Montgomery
ATTORNEYS

DEVICE AND METHOD FOR TESTING POTENCY OF BIOLOGICAL CONTROL REAGENTS

BACKGROUND OF THE INVENTION

This invention relates to a device for testing the potency of a biological control reagent, a test method involving use of the device, and a method of producing the device.

WIth the discovery and production of biological control reagents, it has become necessary to develop test procedures for rapid, accurate, and economical determination of the effectiveness of the reagents against a wide variety of organism of known and unknown character. As employed in the present specification, the term "biological control reagent" means any material having an identifiable and reproducible retardant effect on an organism, whether partial or total, and whether accompanied by destruction of cells or only by inhibition of growth. The term therefore includes but is not limited to toxicant effects since, as will become evident, the invention is applicable to precipitation or flocculation of biologicals where toxicity does not necessarily result. The term therefore broadly includes chemically identifiable compounds, whether single species or mixtures thereof, and natural materials of complex composition. Specifically, the term includes biocidal and biostatic compounds and materials, whether broad or narrow spectrum in their activity, and which may be effective against one or more of microbes, such as bacteria, fungi, algae, yeasts, molds, and viruses; pests, such as insects, nematodes, aphids, mites, and the like; and various undesirable plants and growths which attack plants. While the invention has wide application, antimicrobial susceptibility testing will be discussed as representative.

Many factors complicate determination of levels of control afforded by antibiotics. More than 20 antibiotics are in commercial production and some of these have been shown to be broad spectrum in their effectiveness. However, the organism it is desired to control either may be of unknown origin or may have developed resistance to certain antibiotics, or to established dosages of such antibiotics, so that tests are continually required either to recognize the natural or developed resistance, or to determine which antibiotics and concentrations thereof would be effective in controlling the organism. In most instances, "control" means a biostatic effect, that is, inhibiting the growth of the organism. In other instances, "control" means destruction of the organism as well as inhibition of its growth. The concentrations of the antibiotic which can be tolerated in the blood varies somewhat from one antibiotic to another. The concentration range tolerable or achievable in the blood is often described as the "-blood level" of the antibiotic. Knowledge of the blood level of an antibiotic is significant also for the reason that such concentrations must be reproducible in the in vitro testing of the susceptibility of microbial substances to the antibiotics. If an organism is susceptible to antibiotic concentrations higher than achievable blood levels but resistant to lesser concentrations, then treatment with that antibiotic will not only be ineffective but may lead to the development of an even more resistant strain of the organism.

Early methods of susceptibility testing concentrated on accuracy of results and relied upon tube and agar serial dilution techniques, in which the organisms were exposed to multiple dilutions of the antibiotics in broth and gels, covering the concentrations ranging from just above the maximum achievable blood levels of the antibiotics down to the lowest clinically significant level. But in the laboratories of the larger hospitals, it is common to run hundreds of such tests in a single day. Because of the tedium and time consuming aspects of the dilution methods, the less sophisticated disk diffusion techniques have been adopted.

One such method involves the use of a plurality of blotting paper disks impregnated with one, two or three concentrations of the antibiotic being tested. The disks are applied to a suitable agar medium in plates, which medium has been inoculated with cultures of the organism to be examined. After incubation, the level of control of the organism is read relative to the appearance of zones of inhibition of growth of the organism around the disks. A clear zone appearing around both the high and low concentration disks means the organism is sensitive to the antibiotic, and a clear zone surrounding only the high concentration disk indicates moderate or slight sensitivity. Complete absence of a zone means that the organism is resistant to the antibiotic. Testing methods have also been developed based upon the use of single disks. These methods, even when great precision is not required, still depend on precise knowledge of the varying rates of diffusion of different antibiotics through agar, inoculum size, choice of culture medium, depth of agar, and other variables, and have led to misleading interpretations and conclusions regarding susceptibility.

The variability of results in the disk method has been reduced somewhat by the standardization of the inoculum, and other aspects, as in the Kirby-Bauer procedures, but the single concentrations, or high and low concentrations, tested often occasions development of resistant strains in the test organisms. The range of concentrations of the earlier serial dilution methods avoided these problems. Accordingly, the disk technique on the whole remains unsatisfactory, particularly where errors cannot be risked.

Automatic equipment has been developed to permit return to the accuracy of the tube multiple dilution techniques but the expense of such equipment often makes it prohibitive to many small hospitals and clinics.

OBJECTS AND SUMMARY

Accordingly, an object of this invention is to provide a device and method for testing the potency of a biological control reagent having the accuracy of serial dilution tests.

Another object of the invention is to provide a new and improved device and method for testing the potency of a biological control reagent, such as the minimum inhibitory concentrations (MIC) of various antibiotics to known and unknown organisms, and which may be used to determine and compare the MIC of several different antibiotics at the same time.

A further object of the invention is to provide a new and improved device and method for measuring the potency of a biological control reagent, which is inexpensive and useful with a wide variety of biological control reagents and biological materials which it is desired to control.

An additional object is to provide a new and improved device for testing the potency of biological control reagents which is easily adapted to automated techniques, particularly metered filling and inoculation, and the reading and recording of results.

A still further object is to provide a new and improved device for testing the potency of a biological control reagent susceptible to convenient and inexpensive quality control.

Another object is to provide a new and improved method for producing the devices of the invention.

These and other objects, features and advantages of the invention will be apparent from the specification which follows.

The invention accordingly comprises a device, a method of use of the device, and a method of producing the device, possessing the features, properties, relation of elements, steps, and the relation of one or more such steps with respect to each of the others, which will be exemplified in the device and methods hereinafter disclosed, and the scope of the invention will be indicated in the claims.

In summary, the device of the invention comprises a plurality of interconnected receptacles, such as plastic cups or wells, these receptacles containing a range of quantities, including zero quantities, of the reagent in an essentially dry state but which may be redispersed to provide the predetermined range of concentrations, and means for sealing the receptacles against contamination. The method of use of the devices comprises redispersing the reagent in the receptacles in a medium effective for testing the potency of the reagents, to provide the predetermined range of concentrations, inoculating all or a portion of the receptacles with the biological material to be tested, and reading the resultant level of control. In the preferred method of producing the device of the invention, solutions providing the predetermined range of concentrations of the reagent, including zero concentrations, are inserted into the plurality of interconnected receptacles, the solutions are then treated to reduce the reagent in each receptacle to an essentially dry state, and the receptacles are then sealed against contamination.

DETAILED DESCRIPTION

For a fuller understanding of the nature and objects of the invention, reference is had to the following description taken in connection with the accompanying drawing, in which:

FIG. 1 is a perspective view of a device of the invention;

FIG. 2 is a partially fragmentary top plan view of the same device together with sealing means;

FIG. 3 is a vertical section along the line 3—3 of FIG. 2; and

FIG. 4 is a top plan view of a plurality of devices of the invention interlocked to from a tray of such devices.

With reference to FIGS. 1—3, a device 11 of the invention comprises a plurality of receptacles 12, such as cups or wells, interconnected integrally as by horizontal support member 13, and vertical support members 14, 15, 16 and 17. Vertical support members or legs 15 and 16 are provided with male members or edges 18 and 19 and female members 20 and 21 for mating or interlocking with the complementary edges and grooves of identical devices. By means of these edges and grooves a series of the devices may be interlocked to form a tray 27, as shown in FIG. 4, for purposes to be explained below. In order to orient the device 11 relative to the ascending or descending order of concentrations of reagent in the receptacles, and also to facilitate handling of the devices during manufacture and filling, a lug 23 may be provided at one end of the devices. It will be apparent that the orienting and handling functions of the lug 23 may be provided by other means, such as asymmetric location of vertical support members 15 and 16, or by projecting edges or depressions at other locations on the devices.

The reagent to be tested and/or concentrations thereof may be identified by any suitable indicium 24 imprinted, etched, or otherwise carried on horizontal support member 13 of the device. Such indicia may carry color codes, printed codes or any identifying characters which may be visually, manually or electronically read. A particular useful form of indicium is a binary code comprising the identity of the biological control reagent and the concentration thereof in each receptacle for reading by automatic reading equipment. Such indicia may also include a date code to facilitate rejection of devices containing expired biological control reagent.

As shown in FIG. 3, each receptacle 12, except the last two receptacles 12a and 12b, contains a range of quantities of biological control reagent in an essentially dry state, such as a powder 25. the dry reagent is provided in a manner explained below.

The strips of receptacles forming the devices of the invention are conveniently and preferably produced by the injection molding of clear polystrene or other suitable transparent plastic such as acrylic, polycarbonate, and the like. Polystyrene is preferred since it is sufficiently cheap to permit incineration of the devices after use, is inert to most of the biological control reagents and materials to be added to the receptacles, and is sufficiently transparent to permit visual observation of the contents of the receptacles from below the receptacles, or otherwise to read the results without having to unseal the receptacles. Opaque plastic or other opaque material, such as aluminum sheet, may also be used to form the strips of receptacles.

Although the accompanying drawing shows a longitudinal, linear arrangement of the receptacles as strips, the arrangement may take any form which will satisfy the objectives of the invention, such as a circular plate, a square plate, and the like, and whether the receptacles are arranged asymmetrically or symmetrically therein. Similarly, interlocking grooves and edges may be other than vertical or symmetrically placed. For example, sliding horizontal interlocking grooves may be provided rather than vertical, or non-integral locking means may be used.

After molding of the strips of receptacles, the strips are sterilized, as by a blanket or ethylene oxide, or by other means known in the manufacturing of sterile hospital supplies. Preferably, the entire filling and sealing operations are conducted under aseptic conditions. Into the receptacles is then inserted equal volumes of solutions representing a range of concentrations of the biological control reagent. In this connection, the term "range" may include, and preferably includes, a zero concentration solution, that is, the dispersion medium for the biological control reagent but not the reagent itself. Preferably, at least two of the receptacles are provided with zero concentration solutions, one for growth control and the other for sterility control, as further explained below. The concentrations represented in the range may be arbitrary or, in the more usual case, may correspond to the serial dilutions usually employed in tube or agar techniques for determining MIC. Thus, the range will include the concentration higher than the maximum achievable blood level for the control reagent being investigated down to the concentration which usual experience indicates would be too low for effective treatment.

Any number of receptacles may be included in a strip, this being determined by the concentrations it is desired to have represented. Preferably, as indicated in the drawing, eight receptacles are provided for eight concentration levels of the control reagent, and two receptacles, designated 12a and 12b, are provided as controls. For example, the MIC of tetracycline against an unknown organism may be quickly determined by employing a device of the invention having quantities of tetracycline in the receptacles which, on redispersion provide concentrations of 50 micrograms per milliliter in the first receptacle, 25 in the second cup, 12.5 in the third receptacle, down to 0.39 in the eight cup. The ninth and 10th cups will contain the dispersion medium for the tetracycline but not tetracycline itself.

THe dispersion medium for the biological control reagent may be any of the solvents or mixtures useful for this purpose, such as the known pharmaceutically acceptable saline solutions used to form stock solutions of antibiotics. When the dispersion medium is aqueous, any suitable method may be used to reduce the solutions to an essentially dry condition, such as the well-known lyophilization technique. This technique involves rapid freezing and then rapid dehydration from the frozen state under a high vacuum accompanied by sublimation or vaporization to leave the active ingredient as an essentially dry material. When the control reagent is an antibiotic such as penicillin, it is preferred to employ a substantially non-aqueous dispersion medium in order to facilitate removal of the medium, as explained below, and to avoid the deterioration of such antibiotics believed to result from the presence of moisture in the stock solutions of the reagent which are kept on hand for susceptibility testing.

It is particularly preferred to employ as the reagent dispersion medium a volatilizable organic solvent system such as a lower alcohol, particularly methyl or ethyl alcohol, so that after the receptacles are filled with the requisite solutions, the solvent can be quickly and substantially totally removed by evaporation, heating, flashing or other suitable means, and deterioration during storage of stock solutions of the reagent is minimized. This method of removing the dispersion medium also is less complicated, time consuming, and expensive than lyophilization. In some instances, the dispersion medium may include water, as in a mixture of water with a water-miscible alcohol.

After removal of the dispersion medium, or at least substantially all of the medium, there remains in each receptacle except the control receptacles a quantity of the biological control reagent in an essentially dry state. The strip of receptacles is then sealed against contamination, preferably in an inert atmosphere such as nitrogen, with any suitable sealing material 26 such as plastic film. A preferred sealing material is aluminum foil since it provides a superior moisture and oxygen barrier, and therefore extends the life of the antibiotic. The film or foil 26 may be heat-or pressure-sealed to the strip of receptacles and should be of sufficient length to provide a tab end overlaying one end of the strip, such as lug 23. The sealed strip of receptacles may then be resterilized as by radiation, e.g., electron beam or gamma radiation, and stored singly or in packages or trays with other strips for storage or shipment. Normally, each strip of receptacles will provide a range of quantities of a single biological control reagent so that trays of replicate strips may be formed or strips of different biological control reagents may be formed into a tray 27 as illustrated in FIG. 4.

In the test method employing the devices of the invention, the operator first removes the sealing material 26 by grasping the tab overlaying lug 23 and peeling in the direction shown by the arrow in FIG. 3. If replicate susceptibility determinations are required, a plurality of strips of receptacles containing the same control reagent may be formed into a tray 27 as shown in FIG. 4. Next, the quantities of biological control reagent in each receptacle are redispersed to form the predetermined range of concentrations, by addition of a suitable dispersing agent or solution. The dispersion medium may be the same as employed in forming the stock solutions of the control reagent used to fill the receptacles. In the case of antibiotics, which usually are commercially produced in a water soluble form, the sterile broth normally employed as the culture medium for the organism to be tested, may be used as the redispersing medium. The same volume of redispersion medium or sterile broth is added to all of the receptacles, including the last two receptacles. The total volume of reagent in each receptacle after redispersion should be such as to permit turbidity (growth) measurements. About 0.1 milliliters total volume is usually sufficient for this purpose. Auxiliary dispersing means may be employed to aid the redispersion of the dry control reagent, such as the addition of a surfactant to each of the receptacles or the use of mechanical, magnetic, or sonic mixing devices.

All of the receptacles in the strip, except one of the two control receptacles, are then inoculated with the test organism. The control receptacle which does not contain either the biological control reagent or the organism thus provides a sterility control for the strip of receptacles. If necessary, the strip of receptacles is then resealed, as by application of an adherent plastic film or aluminum foil, and incubated. If incubation is not required, observations are begun as to control of the organism by the reagent.

When incubation is required, the temperature and duration of incubation will depend upon the test organism as well as the control reagent. Usually, about 6 to 24 hours at 35°–37° C. are required. As with redispersion, inoculation may be accomplished by any suitable means, including individual inoculation wires or loops, or with calibrated droppers and the like. Automatic or semi-automatic inoculating systems, including flame sterilizers, are also known for this purpose.

After incubation, the results can be read visually by observing the degree of growth of the organism through the bottom of the receptacles without removing the plastic or aluminum seal, if the device is constructed of a transparent plastic. The minimum inhibitory concentration of the control reagent will be the lowest concentration in the strip of receptacles which exhibits no growth of the organism. The first of the control receptacles, that containing the test organism in the dispersion medium but without the control reagent, should exhibit abundant growth. The second control cup, containing dispersion broth without organism or control reagent, should remain clear as an indication of sterility of the strip. If either result is absent, the operator will know that the strip of receptacles is contaminated.

By employing suitable indicia, automatic equipment may be used to read and record the resulting sensitivity levels. For example, the turbidity which indicates growth in any of the receptacles may be read by known instruments, employing photocells or light transmission measuring devices, or color indicators may be employed with the dispersing medium in the receptacles and results read by color changes. However, the latter method is not preferred since the indicator dye often affects the growth of the organisms, thus reducing the reliability of the test method.

The turbidity data may be fed directly into a recording machine or a technician may read the results into a device which translates the data into machine language for recording on computer punch cards. Binary code indicia on the strips of receptacles also facilitates such recording.

As already mentioned, any number of receptacles may be included in one strip to form a device of the invention. It is advantageous, however, to limit the number of receptacles per strip to a low number, preferably about 8-12, and to package strips of the same antibiotic together rather than to package strips of different antibiotics together, in order to facilitate quality control, particularly to reduce losses due to rejection in Government certification procedures. For example, if strips of 15 different antibiotics were interlocked and packaged together in a tray, and any one receptacle of the tray failed certification, the entire tray as well as the batches of the 15 antibiotics from which the tray was filled, would be rejected. By packaging only the same antibiotic strips together, and by limiting the number of receptacles per strip, rejection of any one receptacle would cause rejection of only the batch of that one antibiotic.

It should also be apparent that comparative testing of different antibiotics is made convenient by the invention since the requisite trays comprising interlocked strips of the different antibiotics are readily formed at the time and location of the testing. For example, the invention provides rapid, flexible, and convenient comparative determination of the sensitivities and MIC of the following antibiotics:

| | |
|---|---|
| Ampicillin | Nalidixic Acid |
| Cephaloridine | Neomycin |
| Cephalothin | Oleandomycin |
| Chloramphenicol | Oxacillin |
| Cloxacillin | Penicillin G |
| Colistimethate | Phenethicillin |
| Colisten | Polymyxin B |
| Dicloxacillin | Streptomycin |
| Erythromycin | Tetracycline |
| Gentamicin | Vancomycin |
| Kanamycin | |
| Lincomycin | |
| Methicillin | | and the sulfanamides.

A further advantage of the devices and method of the invention relates to reduction of the unit cost of certification of an antibiotic. The provision of the antibiotic in a large plurality of cups of small measure according to the invention greatly multiples the number of production units per certifiable batch of stock solution, thereby greatly reducing the unit cost of certification.

While the invention has been described in connection with determining the sensitivities of antibiotics, especially minimum inhibitory concentrations, the invention is applicable also to numerous other forms of determinations of potencies of biological control reagents. For example, the invention is useful for determination of levels of sensitivity or susceptibility of various biologic fluids to toxins. In the standard method of determining the concentrations or strengths of toxin or antitoxins, a row of ten test tubes is set up containing a range of concentrations of antitoxin, such as diptheria antitoxin. To each tube is then added a fixed amount of a filtered broth culture containing the toxin in unknown amount, in the case of diptheria toxin a culture of Corynebacterium Diptheriae. After a short time a precipitant appears in one of the tubes and the concentration of antitoxin in this tube is then regarded as the precipitating potency of the toxin broth, sometimes described as "flocculation units", $L_f$. This measure of potency is not necessarily a measure of toxicity but is an extremely valuable property in the study and control of antigen-antibody reactions.

The device and method of the invention is useful in a converse application of the technique. Thus, the receptacles of the device may contain a range of amounts of the toxin to which, after reconstitution by redispersion in accordance with the invention, may be added constant amounts of the antitoxin. The precipitation or flocculation then observed defines the precipitating potency $L_f$ of the toxin. The biologic fluid often used in such tests is urine.

The device and method of the invention is applicable also to complement fixation determinations and to identification of bacteria by agglutination reactions, including hemagglutination and hemagglutination inhibition, since these tests in the past have required the use of a series of dilutions of biological materials such as body serums. In accordance with the invention, in place of adding constant amounts of a biological control reagent to the dilutions of the serum, the biological control reagent is provided in the receptacles of a device of the invention in a range of concentrations, and constant amounts of the serum are then added to the redispersed reagents. Such techniques are well known in their converse (serum serial dilution) form as described, for example, in Frobisher, Fundamentals of Microbiology, Eighth Edition, W. B. Saunders Co., Philadelphia, 1969, pages 49, 294-297, and 319-326.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for testing the potency of a biological control reagent by contacting a biological material to be controlled with a predetermined range of concentrations of said reagent, which comprises:

a plurality of receptacles arranged in a row to form a unitary strip of said receptacles, wherein the number of receptacles corresponds to said predetermined range of concentrations of said reagent;

said strip having means for longitudinally interlocking a plurality of said strips to form a tray;

said receptacles containing a range of quantities of said reagent, said reagent being in an essentially dry state susceptible to redispersion to provide said predetermined range of concentrations; and means for sealing said receptacles against contamination whereby said device is adapted for storage and transportation in a stable, pre-packaged condition.

2. A device according to claim 1 wherein each said strip includes as controls at least two receptacles not containing said reagent.

3. A device according to claim 2 wherein each said strip comprises at least eight receptacles containing said range of concentrations of said reagent.

4. A device according to claim 2 wherein each said strip carries indicia identifying said reagent and quantities thereof.

5. A device according to claim 4 wherein said indicia comprises a binary code.

6. A device according to claim 2 wherein each said strip is formed of a transparent material.

7. A device according to claim 1 wherein said reagent comprises an antibiotic material.

8. A device according to claim 1 wherein said reagent is sealed with an effective oxygen and moisture barrier material.

9. A device according to claim 1 wherein said reagent is present in said receptacles in an inert atmosphere.

10. A method of producing a device for testing the potency of a biological control reagent, which comprises:

a. providing a plurality of receptacles arranged in a row to form a unitary strip of said receptacles, said strip having means for longitudinally interlocking a plurality of said strips to form a tray, b. inserting into said receptacles solutions providing a predetermined range of concentrations of said reagent, c. treating said solutions to reduce said reagent in each receptacle to an essentially dry state, and d. sealing said receptacles against contamination whereby said device is adapted for storage and transportation in a stable, pre-packaged condition.

11. A method according to claim 10 wherein said reagents are reduced to an essentially dry state by lyophilizing said solutions.

12. A method according to claim 10 wherein said solutions contain as dispersion medium a volatilizable solvent and said reagents are reduced to an essentially dry state by volatilization of said solvent.

13. A method according to claim 10 including the step of sterilizing the receptacles containing said reagent.

14. A method according to claim 10 wherein said reagent comprises an antibiotic material.

15. A method for testing the potency of a biological control reagent which comprises:

a. providing a device comprising a plurality of receptacles arranged in a row to form a unitary strip of said receptacles, said strip having means for longitudinally interlocking a plurality of said strips to form a tray, said receptacles containing a predetermined range of amounts of said reagent in an essentially dry state, and means for sealing said receptacles against contamination of said reagent whereby said device is adapted for storage and transportation in a stable, pre-packaged condition, b. dispersing the reagent in each receptacle in a medium effective to provide solutions having a predetermined range of concentrations, c. inoculating at least a portion of said plurality of receptacles with biological material to be tested, and d. reading the resultant level of control.

16. A method according to claim 15 wherein said plurality of receptacles are arranged in a row forming a strip, said strip including at least eight receptacles containing said reagent and as controls at least two receptacles not containing said reagent.

17. A method according to claim 15 wherein said reagent is an antibiotic and, after inoculation, said receptacles are incubated.

18. A method according to claim 15 wherein, in step (b), sufficient dispersant is added to provide a substantially equal total volume of solution in each receptacle.

19. A method according to claim 15 wherein the resultant level of control is read visually.

20. A method of producing a device for testing the potency of a biological control reagent, which comprises:

a. providing a plurality of receptacles arranged in a row to form a unitary strip of said receptacles, said strip having means for longitudinally interlocking a plurality of said strips to form a tray, b. inserting into said receptacles a predetermined range of amounts of said reagent, c. treating the reagent in each receptacle to the extent required to reduce said reagent to an essentially dry state, and d. sealing said receptacles against contamination such that said device may be stored and transported in a stable, pre-packaged condition.

* * * * *